United States Patent [19]

Kawasaki

[11] 4,421,194
[45] Dec. 20, 1983

[54] TUBING ASSEMBLY IN MUTUALLY MOVABLE PORTIONS OF A THREE-WHEELED MOTOR VEHICLE

[75] Inventor: Katsuyoshi Kawasaki, Mitaka, Japan

[73] Assignee: Honda Giken Kogyo Kabushiki Kaisha, Tokyo, Japan

[21] Appl. No.: 337,549

[22] Filed: Jan. 6, 1982

[30] Foreign Application Priority Data

Jan. 27, 1981 [JP] Japan .............................. 56-9808[U]

[51] Int. Cl.³ .............................................. B62K 5/04
[52] U.S. Cl. .................................. 180/215; 280/5 A; 280/421; 285/62; 137/351
[58] Field of Search ............... 180/210, 215; 280/5 A, 280/420, 421; 137/351; 285/62

[56] References Cited

U.S. PATENT DOCUMENTS

| | | | |
|---|---|---|---|
| 2,922,662 | 1/1960 | Hall | 280/421 |
| 4,316,520 | 2/1982 | Yamamoto et al. | 180/215 |
| 4,340,125 | 7/1982 | Watanabe et al. | 180/215 |

OTHER PUBLICATIONS

Ford-1970 Car Shop Manual, vol. 2 Engine, p. 23-1-0-04, Fuel System.

*Primary Examiner*—John A. Pekar
*Assistant Examiner*—D. Lynn Fugate
*Attorney, Agent, or Firm*—Sughrue, Mion, Zinn, Macpeak, and Seas

[57] ABSTRACT

A tubing assembly provided between two movable bodies such as front and rear body portions of a three-wheeled motor vehicle. The front body is laterally swingable relative to the rear body and these bodies are relatively movable along longitudinal and vertical directions thereof. The tubing assembly includes a first flexible tubular member extending substantially vertically and having one end connected to a first rigid tubular member of said front body portion, a second flexible tubular member extending substantially horizontally and having one end connected to a second rigid tubular member of said rear body portion, and a generally L-shaped intermediate rigid tubular member connected between said first and second flexible tubular members. The tubing assembly is positioned outwardly offset from a rotational center of said movable bodies and at the same longitudinal side of said vehicle.

5 Claims, 6 Drawing Figures

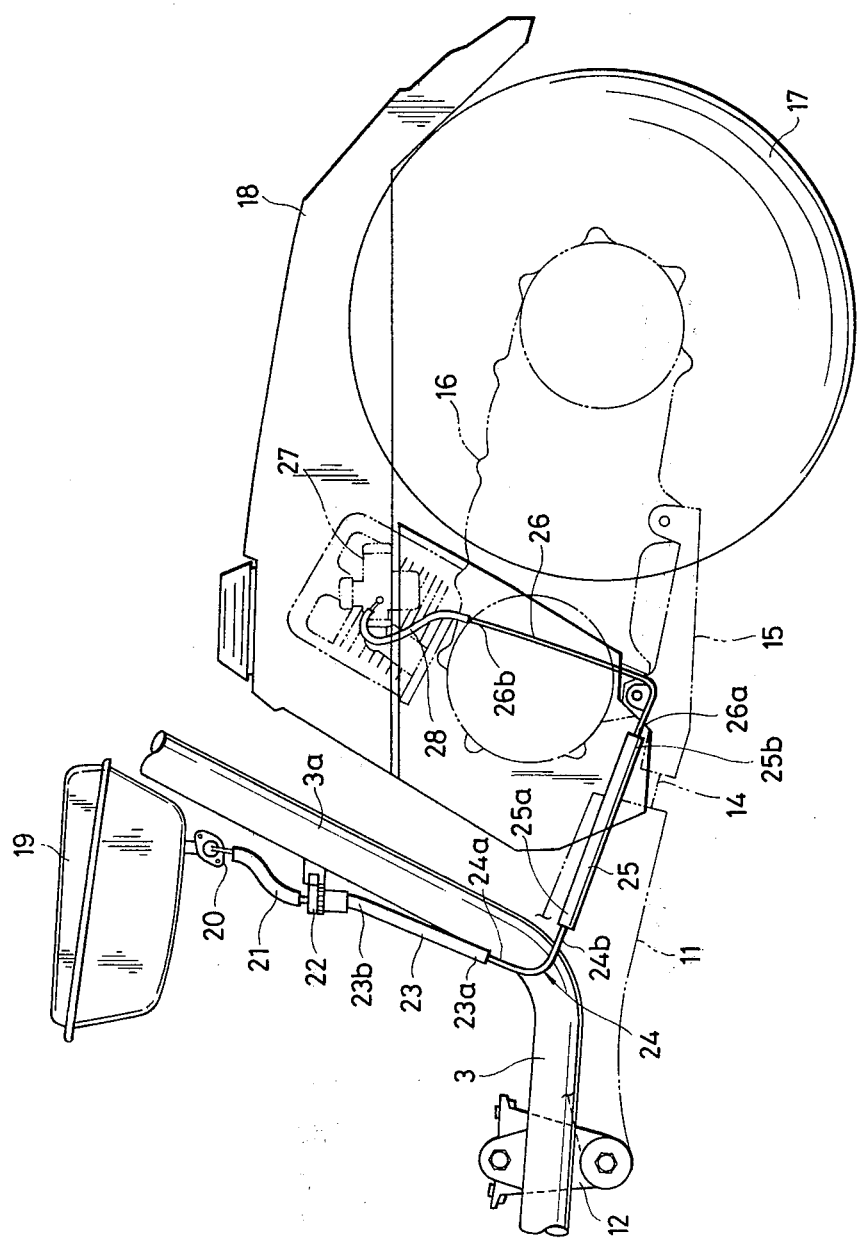

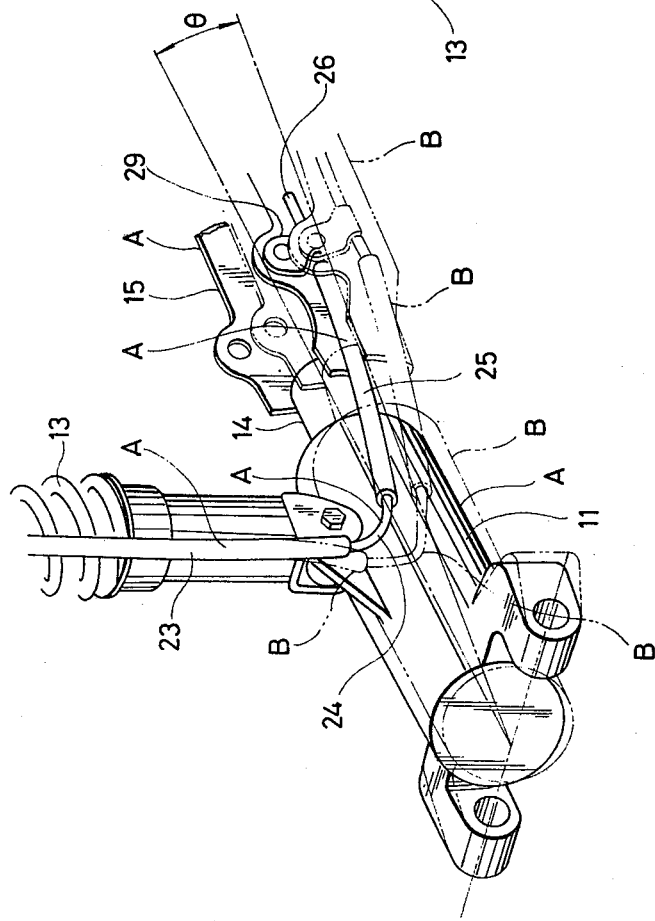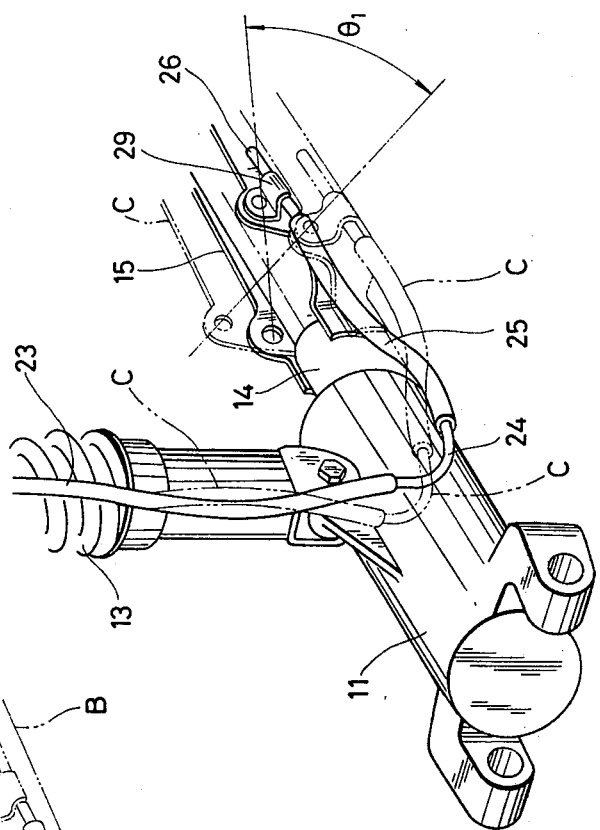

4,421,194

TUBING ASSEMBLY IN MUTUALLY MOVABLE PORTIONS OF A THREE-WHEELED MOTOR VEHICLE

BACKGROUND OF THE INVENTION

1. Field of the Invention

This invention relates to a tubing assembly in mutually movable portions of a three-wheeled motor vehicle.

2. Description of the Prior Art

There is known a three-wheeled motor vehicle having a front wheel and two rear wheels. Its front portion in which the front wheel is mounted is adapted for rolling relative to its rear portion in which the rear wheels are provided, while the rear portion is vertically swingable relative to the front portion. A power unit including an engine is mounted on the rear portion, and a fuel tank on the front portion. A flexible rubber tube connects the fuel tank to the engine to supply fuel thereinto. One end of the rubber tube is connected to an outlet pipe on the fuel tank, while its other end is connected to an inlet pipe on a carburetor in the engine. When the vehicle is driven, the rubber tube is subjected to a three-dimensional motion which consists of the rolling motion of the front vehicle portion, and the swinging motion of the rear portion. This three-dimensional motion results in twisting the rubber tube adjacent to its ends at which it is connected to the fuel tank and the carburetor. As the tube is frequently twisted, it is easily damaged, and fails to provide a satisfactory connection between the fuel tank and the engine.

SUMMARY OF THE INVENTION

In view of the aforesaid problems, it is an object of this invention to provide an improved tubing assembly extending between the front and rear portions of a three-wheeled motor vehicle.

More specifically, it is an object of this invention to provide an improved tubing assembly for supplying fuel from a fuel tank mounted on the front portion of a three-wheeled motor vehicle to an engine on its rear portion.

Another object of the invention is to provide such assembly capable of minimizing distortion of flexible tubes at their end portions adapted to be connected with successive tubular members.

According to this invention, there is provided a tubing assembly comprising a substantially vertically disposed flexible tubular member having one end connected to a rigid tubular member, such as an outlet pipe on a fuel tank, a substantially horizontally disposed flexible tubular member having one end connected to another rigid tubular member, such as an inlet pipe on a carburetor, and a substantially L-shaped rigid connecting tube disposed between the flexible tubular members, and having both ends connected to the other ends of the flexible tubular members, respectively. The two rigid tubular members are located on separate, mutually movable portions which can roll or swing relative to each other, such as the front and rear portions of a three-wheeled motor vehicle, and the two flexible tubular members and the connecting tube therebetween are spaced radially apart from the center of rotation of the mutually movable portions.

A rolling motion acting between the two flexible tubular members is converted to a substantially vertical motion, and the tubing assembly is subjected to only a substantially two-dimensional motion. Accordingly, the tubing assembly is hardly twisted or distorted adjacent to its ends despite the movements of the mutually movable portions relative to each other. Therefore, the tubing assembly substantially prevents the flexible tube from being damaged, and provides secure connection between the rigid tubular members, such as the outlet pipe on the fuel tank and the inlet pipe on the carburetor.

BRIEF DESCRIPTION OF THE DRAWINGS

FIG. 2 is a fragmentary, enlarged view of FIG. 1;

FIG. 3 is a fragmentary perspective view illustrating the swinging motion of vehicle portions;

FIG. 4 is a view similar to FIG. 3, but showing the rolling motion of the vehicle portions;

DETAILED DESCRIPTION OF THE INVENTION

Figure 1:
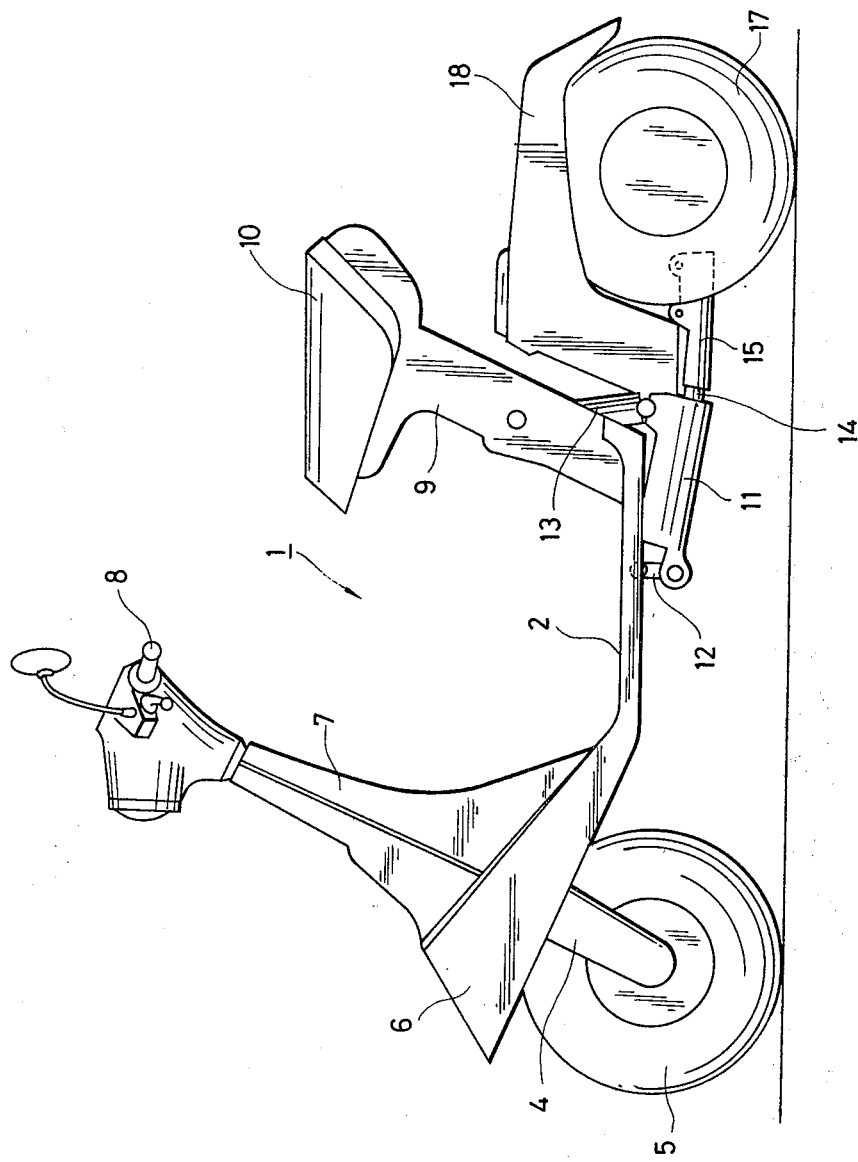
FIG. 1 is a side elevational view of a three-wheeled motor vehicle in which a tubing assembly embodying this invention is employed.

Referring first to FIG. 1 of the drawings, there is shown a three-wheeled motor vehicle 1 having a front portion 2 which includes a main body 3 (FIG. 2) formed from a pipe, or the like. A front fork 4 is provided below the front end of the front portion 2, and supports a front wheel 5 thereon. A front fender 6 is provided at the front end of the front portion 2, and carries a handle post 7 thereon. A handle bar 8 is provided at the top of the handle post 7, and connected to the front fork 4 for steering the vehicle. As shown in FIG. 2, the main body 3 includes an upwardly bent rear end portion 3a surrounded by a seat post cover 9, and a seat 10 is provided at the top thereof.

A vertically pivotable swing joint 11 is suspended under the main body 3 adjacent to its rear end portion 3a, and has a front end pivotably supported on the main body 3 by a link 12. The swing joint 11 has a rear end which is connected at its top to the rear end portion 3a of the main body 3 by a rear cushion unit 13. The swing joint 11 is also connected to a rear portion 15 of the vehicle 1 by a shaft 14 which functions as a rolling joint. A power unit 16 including an engine is mounted on the rear portion 15, and connected to a pair of rear wheels 17 which drive the vehicle. A rear fender 18 is disposed above the rear wheels and serves as a cover for the power unit 16.

The rear portion 15 of the vehicle 1 is vertically rotatable about the front end of the swing joint 11 at which it is connected to the link 12, and the rear cushion unit 13 exerts a buffering action on such rotation. The horizontal displacement of the rear wheels 17 along travel direction of the vehicle is absorbed by the swinging motion of the link 12. The front portion 2 of the vehicle 1 rolls about the shaft 14.

A fuel tank 19 is mounted on the upstanding rear end portion 3a of the main body 3 of the front vehicle portion 2. A rigid joint 22 is attached to the rear end portion 3a, and a cock 20 and a connecting tube 21 are connected between the tank 19 and the rigid joint 22. A substantially vertically disposed first flexible tubular member 23, such as a rubber tube, has one end 23b connected to the joint 22. The other end of the rubber tube 23 is connected to an L-shaped rigid connecting tube 24 which may be an L-shaped metal pipe. The L-shaped connecting tube 24 includes a substantially vertically disposed portion 24a having an end connected to the other end 23a of the rubber tube 23. The connecting tube 24 also includes a substantially horizontal disposed portion 24b having an end connected to one end 25a of a second flexible tubular member 25 which is substantially horizontally disposed, and extends longitudinally of the vehicle. The second flexible tubular member 25 may also comprise a rubber tube. The other end 25b of the rubber tube 25 is connected to one end 26a of an L-shaped rigid connecting pipe 26. The other, or upper end 26b of the L-shaped connecting pipe 26 is connected to a carburetor 27 by a rubber tube 28. Thus, the fuel tank 19, cock 20, connecting tube 21, first flexible tubular member 23, L-shaped rigid connecting tube 24, second flexible tubular member 25, L-shaped connecting pipe 26, and rubber tube 28 form a system for supplying fuel to the engine.

Figure 6:
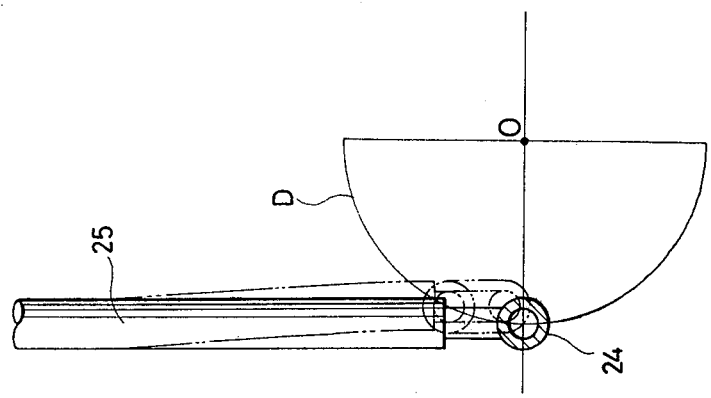
FIG. 6 is a view illustrating the position of the tubing assembly during the rolling motion of the vehicle portions.

The first flexible tubular member 23, L-shaped rigid connecting tube 24 and second flexible tubular member 25, which form the tubing assembly of this invention, are all positioned on one side of the sewing joint 11, the rolling joint 14 and the rear vehicle portion 15, as shown in FIGS. 3, 4 and 6. The L-shaped connecting pipe 26 has a lower portion retained by a clip 29 attached to the one side of the rear vehicle portion 15 as shown in FIGS. 3 and 4.

Figure 5:
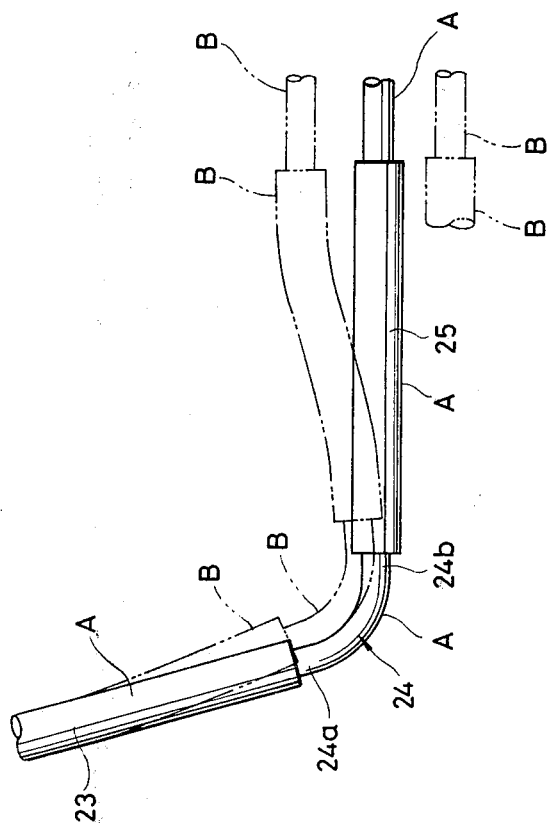
FIG. 5 is a view illustrating the position of the tubing assembly during the swinging motion of the vehicle portions.

When the vehicle is driven, the joints 11 and 14, and the rear vehicle portion 15 swing vertically within a specific angle $\theta$ between their positions shown by solid lines A and chain lines B in FIG. 3. As shown in FIG. 5, the vertical motion of the second flexible tubular member 25 is transmitted to the L-shaped intermediate connecting tube 24 to raise and pull its end 24b, while the first flexible tubular member 23 connected to the opposite end 24a of the connecting tube 24 is moved merely longitudinally of the vehicle. Thus, no distortional force is applied to the connecting portions of the tubes 23 to 25.

The joint 11 and the rear cushion unit 13 carried on the front vehicle portion 2 can be rolled relative to the rear vehicle portion 15 and the shaft 14 supported thereon within a specific angle $\theta_1$ between their positions shown by solid lines and chain lines C in FIG. 4. If the second flexible tubular member 25 supported on the rear vehicle portion 15 rolls from side to side and swings vertically, the L-shaped rigid connecting tube 24, and hence the first flexible tubular member 23 are also caused to move accordingly. Thus, relative distortion between the first and second flexible tubular members 23 and 25 is substantially prevented. Since they are outwardly spaced apart from the center of rotation of the rolling and swinging parts of the vehicle as hereinabove stated, the L-shaped rigid connecting tube 24 rolls and swings about the center O of rotation along an arcuate path D having a specific radius. The connecting tube 24 makes a combined vertical and horizontal motion along the path D. Thus, the distortion of the tube 24 is minimized. Therefore, the flexible tubular members 23 and 25 make a substantially two-dimensional motion adjacent to their ends, so that distortional force applications to the connected ends of the respective flexible tubes is available or minimized.

In view of the foregoing, according to this invention, minimized is the distortion of the connecting portions of the tubing assembly which includes flexible tubular members, even under the connection between relatively movable bodies, this relative movement being the combination of vehicle running direction and laterally swinging direction about the longitudinal center of the vehicle. This assembly is advantageous for the connection of the fuel supplying system, bridging between the relatively movable bodies.

What is claimed is:

1. A tubing assembly for use in a three-wheeled motor vehicle which includes a front body portion providing a front wheel and a fuel tank, a rear body portion providing a power unit and two opposing drive wheels, and connecting means for connecting said front and rear body portions, said front body portion being rotatably mounted about said connecting means and being vertically and longitudinally movable relative to said rear body portion, comprising;
    (a) a first flexible tubular member extending substantially vertically and having one end connected to a first rigid tubular member secured to said front body portion and leading to an outlet of said fuel tank;
    (b) a second flexible tubular member extending substantially horizontally and having one end connected to a second rigid tubular member secured to said rear body portion and leading to an inlet of said power unit; and
    (c) a substantially L-shaped intermediate rigid tubular member having each end connected to the other end of one of said first and second flexible tubular members, said first and second flexible tubular members and said intermediate rigid tubular member being outwardly spaced apart from said axial center of said connecting means and positioned at the same longitudinal side of said three-wheeled motor vehicle.

2. A tubing assembly of claim 1, wherein said first and second flexible tubular members are formed of rubber and said intermediate rigid tubular member is formed of metal.

3. A tubing assembly of claim 1, wherein said second rigid tubular member is generally L-shaped and extending substantially vertically, said second rigid tubular member being supported on said rear body portion and having the other end connected to a carburetor of an engine of said power unit.

4. A tubing assembly of claim 1, wherein said first flexible tubular member extends along an upstanding portion of said front body portion, and said second flexible tubular member extends along said connecting means.

5. A tubing assembly of claim 1, wherein said connecting means comprises a swing joint having a front end pivotally connected to said front body portion, and a rolling joint having a front end connected to a rear end of said swing joint and a rear end connected to said rear body portion.

* * * * *